United States Patent [19]

Genheimer

[11] Patent Number: 5,159,501
[45] Date of Patent: Oct. 27, 1992

[54] ADAPTIVE PREWRITE COMPENSATION APPARATUS AND METHOD

[75] Inventor: Stephen R. Genheimer, Mustang, Okla.

[73] Assignee: Seagate Technology, Inc., Scotts Valley, Calif.

[21] Appl. No.: 728,289

[22] Filed: Jul. 11, 1991

Related U.S. Application Data

[63] Continuation of Ser. No. 319,251, Mar. 3, 1989, Pat. No. 5,047,876.

[51] Int. Cl.$^5$ .............................................. G11B 5/09
[52] U.S. Cl. ......................................... 360/45; 360/46
[58] Field of Search .................................... 360/45, 46

[56]  References Cited

U.S. PATENT DOCUMENTS

| | | | |
|---|---|---|---|
| 3,879,342 | 4/1975 | Patel | 360/45 |
| 4,000,513 | 12/1976 | Precourt | 360/45 |
| 4,205,352 | 5/1980 | Tomada | 360/45 |
| 4,633,336 | 12/1986 | Horie et al. | 360/45 |
| 4,635,141 | 1/1987 | Coulter | 360/44 |
| 4,809,088 | 2/1989 | Lofgren et al. | 360/31 |
| 5,025,327 | 6/1991 | Stamness et al. | 360/45 |

*Primary Examiner*—A. J. Heinz
*Assistant Examiner*—Joseph P. Kraynak, Jr.
*Attorney, Agent, or Firm*—Edward P. Heller, III; Bill D. McCarthy; Louis W. Watson

[57] ABSTRACT

A prewrite compensation circuit for selectively delaying the writing of non-zero bits of data streams to disks of a hard disk drive. The hard disk drive includes a write circuit for writing the non-zero bits to selected portions of selected disk surfaces and selected write delays are effected by a variable delay circuit that receives the data stream from a shift register through which the data stream is passed. The amount of delay is determined by a delay word entered into a latch connected between the variable delay circuit and a RAM in which delay words are stored at addresses selected for each delay word in relation to the pattern of bits of the data stream surrounding each non-zero bit, the disk surface to which each data stream is to be written and the portion of the surface to receive the data stream. Encoders connected to the shift register provide a portion of the RAM address to a data latch connected to address terminals of the RAM and a control microprocessor provides stored remainders of the RAM address, corresponding to the disk surface and disk surface portion to which the data stream is to be written, to other address terminals of the RAM.

3 Claims, 2 Drawing Sheets

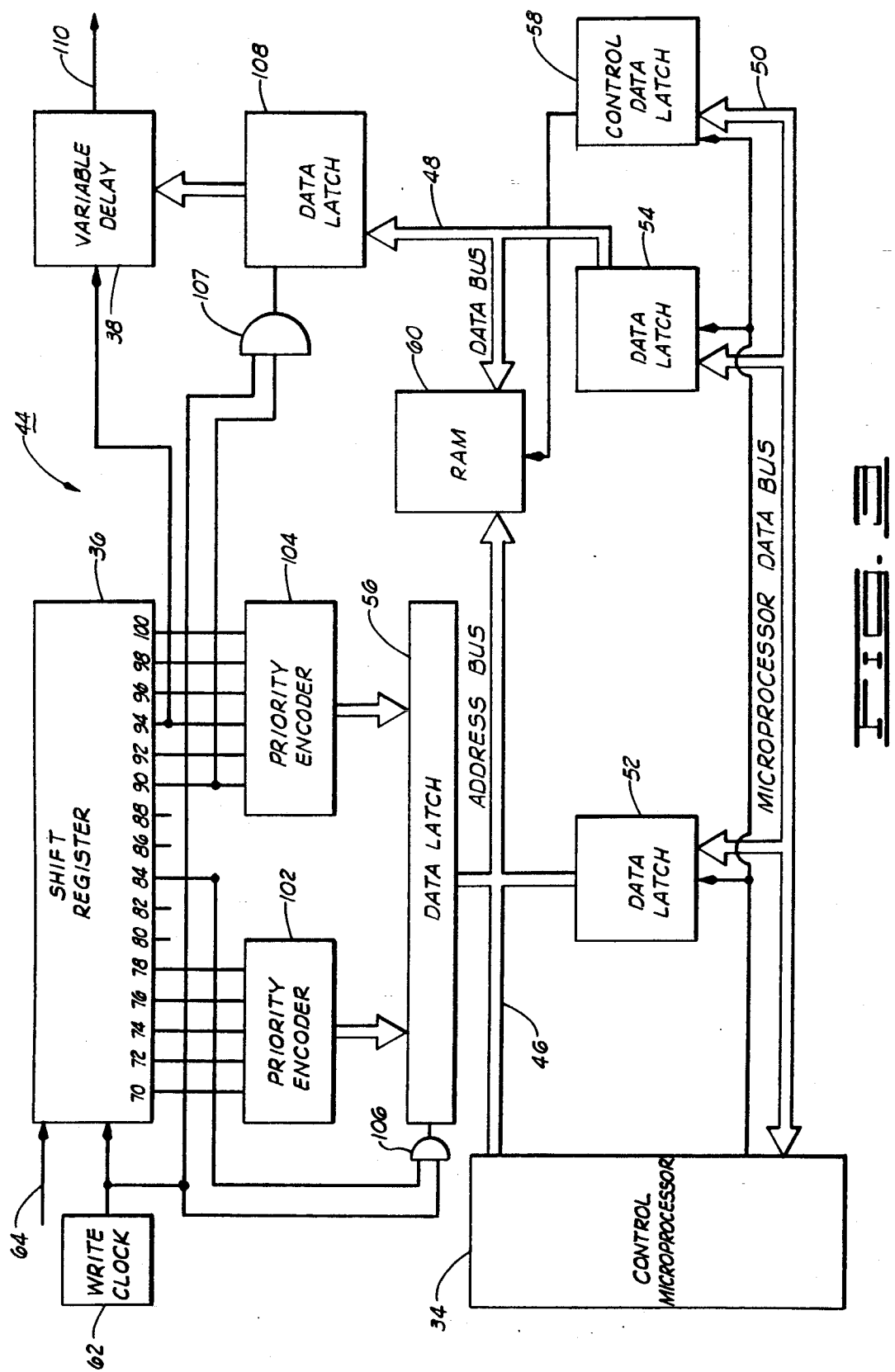

ADAPTIVE PREWRITE COMPENSATION APPARATUS AND METHOD

CROSS REFERENCE TO RELATED APPLICATIONS

The present application is a continuation of United States patent application entitled "Adaptive Prewrite, Compensation Apparatus", Ser. No. 319,251, U.S. Pat. No. 5,047,876, filed Mar. 3, 1989 by Stephen R. Genheimer and Steven V. Holsinger.

BACKGROUND OF THE INVENTION

1. Field of the Invention

The present invention relates generally to a disk drive assembly and delay circuitry for time delay compensation of digital data prior to writing it on a magnetic medium.

2. Brief Description of the Related Art

Digital data are written on a magnetic medium by the use of flux transitions. A flux transition is a site of change in the physical orientation of the medium, hence a change in the magnetic flux generated by the medium at that site. When a flux transition is written by a transducing head on the medium in a disk drive assembly it is written in the context of the prior flux transition and the next flux transition. When the flux transition is read back by the head, it will typically be perceived to be at a different interval in time in relation to the prior flux transition and the next flux transition. This phenomenon is known as peak shift, a generic term for the problem addressed by the present invention. Peak shift is a problem because if the change in time interval between flux transitions becomes great enough, the data pattern read back from the magnetic medium may be incorrect, i.e. the flux transition may fall outside of its detection "window".

One conventional method of dealing with peak shift is to administer prewrite compensation when writing a data pattern. This means each flux transition written is moved a short interval of time (early or late) so that the peak shift is minimized or at least lessened in most cases. The problem with this approach is that only one value of prewrite compensation is used even though a range of peak shift values is generally significant with respect to any single value of delay.

The present invention is designed to address this unresolved problem by adaptively compensating for peak shift. Adaptivity is achieved by determining the actual peak shifts promulgated by a given disk drive assembly under certain parameters. The parameters adaptively covered by the present invention are: (1) the head/media pair to be used for writing; (2) the writing site on the disk; and (3) the data pattern to be written.

Of interest is Horie et al., U.S. Pat. No. 4,633,336 which uses prewrite compensation based on the above-mentioned parameters but only in a limited sense. The Horie system determines whether prewrite compensation is appropriate based on the parameters and then simply generates a set value of compensation for each parameter, if appropriate. In contradistinction, the present invention does not use a set value for each parameter but rather a value based on the specific combination of parameters used so that the values generated by the present invention are more variable than the values used by Horie and are applied with much more flexibility.

SUMMARY OF INVENTION

The present invention comprises a disk drive assembly and delay circuitry which determines a time delay value appropriate for writing flux transitions on a magnetic medium under a given set of conditions so that the readback signal is received at the desired time. This is accomplished by introducing a serial data pattern into the delay circuitry at a shift register from a drive interface in digital form. The serial data pattern is then decoded at circuitry connected to the shift register. A combination of a transducing head and a writing location used for writing the data pattern on the magnetic medium is determined by the disk drive assembly. An adaptive prewrite delay value (sometimes referred to hereinbelow as a prewrite delay value or a delay value) based on the combination and the data pattern is then computed by the disk drive assembly which then writes the data pattern on the magnetic medium with reference to the write delay value so that, when the data pattern is read back by the head, the flux transitions are perceived to be separated by the same distance in time as when introduced into the shift register.

One object of the invention is to achieve an improved error rate in the read back of written data.

Another object is to increase the performance tolerances for disk drive assembly components such as transducing heads, disks, magnetic media and circuitry elements.

Other objects, features and advantages of the present invention will be apparent from the following detailed description when read in conjunction with the drawings and appended claims.

BRIEF DESCRIPTION OF THE DRAWINGS

FIG. 3 is a block diagram of one embodiment of the delay circuitry of FIG. 2 in more detail.

DESCRIPTION

Figure 1:
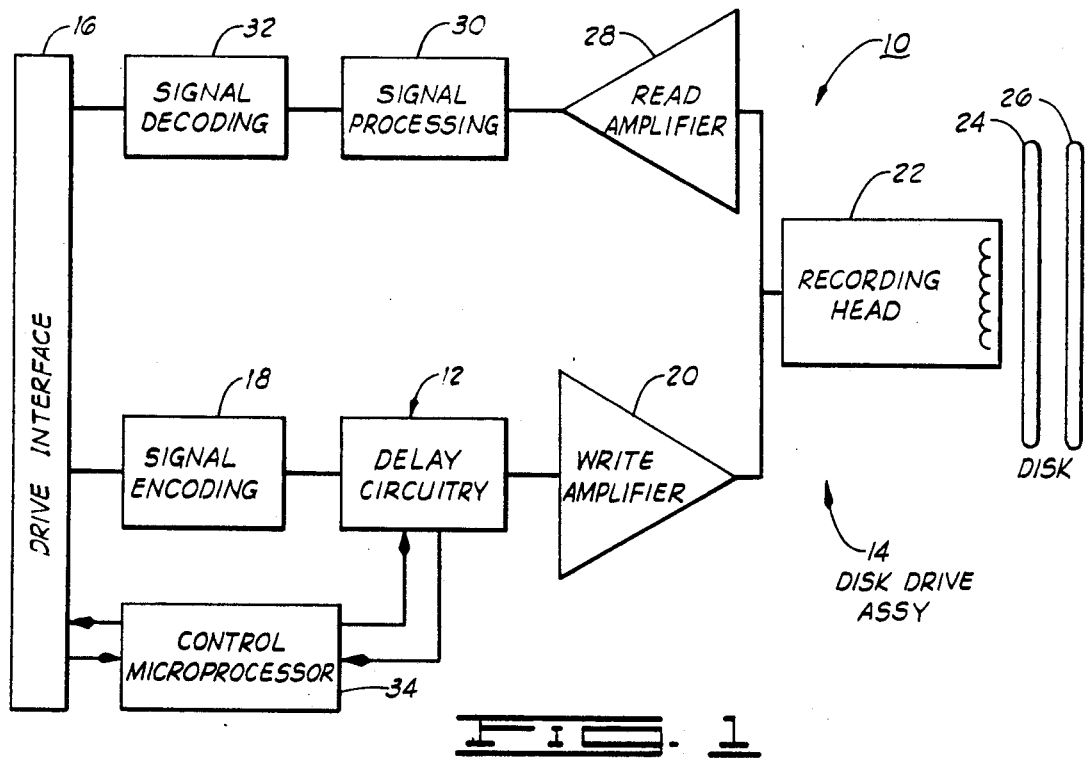
FIG. 1 is a schematic block diagram depicting an adaptive prewrite compensation apparatus constructed in accordance with the present invention.

One of the most useful aspects of a computer is its ability to record and recall data. Recording data is commonly referred to as "writing", while recalling data is commonly referred to as "reading".

Physically speaking, writing is the process of changing a magnetic medium which is located on a disk or plastic tape. The present invention could be applied with either type of material but this disclosure will deal primarily with a hard disk drive assembly The magnetic medium is typically composed of a material such as a ferrous oxide. Each particle in the medium has an electromagnetic orientation which has associated with it a property known as magnetic flux. When the magnetic flux of each particle is in the same direction, the medium is said to be magnetized. In materials suitably magnetizable, the particles tend to be grouped in magnetization clusters called domains. When the electromagnetic orientation of one domain is reversed in a magnetized magnetic medium, the magnetic flux of the domain is also reversed. Therefore, the magnetic flux of the subject domain is opposite in direction compared to the magnetic fluxes associated with the other domains in the magnetized magnetic medium. A flux transition is said to exist at the boundary of a domain. More specifically, a flux transition occurs at any location where adjacent domains have oppositely directed magnetic fluxes.

The smallest unit of information on a magnetic medium is a bit, or binary digit. A bit is simply a flux transition or the lack thereof. A bit corresponding to a flux transition at a given site is said to be a logical ONE bit. A bit corresponding to the absence of a flux transition at a given site is said to be a logical ZERO bit. A sequence of bits is called a data pattern. The number of bits necessary to make a data pattern will be discussed below. A data code is a system used for configuring a data pattern according to rules associated with the system.

Writing data is essentially the act of creating a series of flux transactions on a magnetic medium. Reading data is essentially the act of detecting or perceiving flux transitions which have been written. The act of reading or writing data on a magnetic medium is performed by a transducing head. The head electromagnetically reads and writes flux transitions on the medium. A data pattern is indicated on the medium by means of ONES and ZEROS.

During readback, a phase locked oscillator is locked to the recovered stream of flux transitions, and develops a timing window which is centered around each possible flux transition site. Flux transitions or the absence of same in each window are converted to digital ONES and ZEROS. This digital data stream is then typically decoded into NRZ code and presented at a disk drive interface. The basic purpose of a disk drive write channel is to cause a flux transition to be written in its correct location on the disk surface. The function of the read channel is to detect the flux transition within the desired timing window. Any time the flux transition falls outside of the expected timing window, an error occurs.

There are many factors that can cause a flux transition to be shifted from the center of the timing window. Defects in the medium can cause the flux transition to be moved or completely missing. Fortunately, these defects are usually stationary and can be detected and mapped around so that data is not written in that region. Noise, whether fundamental noise from the recording process, noise in the readback circuits or environmental noise, can cause a flux transition to be shifted from its normal positions. While the effect of noise on an individual flux transition cannot be predicted, the average effect of noise can be measured. Noise can be assumed to cause flux transitions to be located in a Gaussian distribution around the center of the detection window.

The fundamental limitation as to how such data can be written within a given area is controlled by how closely the flux transitions can be packed together. As flux transitions are moved closer together, the flux transitions begin to interact with each other due to the fundamental magnetic properties of the recording system. This effect is known as peak shift. The interaction of the flux transitions causes a shift in the location of the transitions in the timing window. Data recovery is usually achieved by differentiation to locate the peak of the flux transition, and the peak may be shifted in time as a result of bit crowding. Excessive peak shift can cause the flux transition to move outside of the timing window, resulting in an error. Even peak shift which does not cause a flux transition to move all the way out of the window reduces the allowable margin for other effects such as noise.

The first two factors mentioned as causes of readback errors (media defects and noise) are addressed by control of the media manufacturing process and by careful circuit design to minimize sources of, and susceptibility to, noise. Peak shift effects are treated differently. The effects of peak shift are predictable and repeatable (at least statistically) based upon the actual flux transition spacing, and can be compensated for to some extent by means of prewrite compensation techniques.

The traditional method of dealing with peak shift has been to administer prewrite compensation when writing a data pattern. That is, each flux transition written may be shifted in time by a small amount (in the order of nanoseconds) so that the peak shift is minimized or at least lessened in most cases. The problem with this approach is that only one value of prewrite compensation is used even though a range of peak shift values is generally significant with respect to this one compensation value.

The present invention, an adaptive prewrite compensation apparatus, is designed to deal with the problem of peak shift in a more flexible way by predetermining (on the basis of measurement and/or interpolation) the adaptive write delay value for each permutation of head, writing location, and data pattern. The writing location includes both the particular disk to be written on and the particular site for writing on that disk. Adaptivity can be predetermined without accounting for the head or can even be predetermined taking into account any combination of the parameters of head and writing location. Instead of determining a write delay value based on an average peak shift value for the disk drive assembly, adaptive write delay values are determined experimentally for each head, writing location, and data pattern (or some combination thereof). The adaptive write delay values can then be recorded on a disk of the disk drive assembly for retrieval at each power-up sequence.

Referring now to the drawings in general and to FIG. 1 in particular, shown therein and designated by the general reference 10 in particular, is an adaptive prewrite compensation apparatus. The adaptive prewrite compensation apparatus 10 is comprised of a delay circuitry 12 and a disk drive assembly 14 (the disk drive assembly 14 is everything in FIG. 1 other than the delay circuitry 12). The adaptive prewrite compensation apparatus 10 has a writing channel and a reading channel, the writing channel beginning at a drive interface 16 going to a signal encoding block 18 and to the delay circuitry 12 through a write amplifier 20 to a recording head 22 which addresses a disk 24. Generally, a plurality of disks are used in the practice of the present invention but only two are shown in FIG. 1 for expediency, a disk 26 also shown therein for discussion within the context of the operation of the present invention. The read channel is described by the disk 24, the head 22, a read amplifier 28, a signal processing block 30, and a signal decoding block 32, the control microprocessor 34 participates in, and controls, both channels. FIG. 1 depicts schematically the adaptive prewrite compensation apparatus 10 as used to read and write. Most of the unique circuitry of the present invention is located in the delay circuitry 12. Once the write signal has been encoded, it is then adaptively delayed before being sent to the write amplifier 20. To illustrate the phenomenon of peak shift, an example will be provided herein as to how prewrite compensation without adaptivity is utilized. This means that an arbitrary amount of prewrite compensation is to be imparted to any data pattern.

For this example, it will be assumed that the arbitrary amount of prewrite compensation to be imparted to any data pattern at the delay circuitry 12 is a negative delay of 2 nanoseconds. It will be understood that such delay can be either positive or negative. "Negative delay" means that the time interval for writing a given pair of ONES is decreased. "Positive delay" means the time interval of writing is increased. A further assumption will be that a data pattern is to be sent from the drive interface 16 to the delay circuitry 12 (the delay circuitry 12 is assumed to be nonadaptive for purposes of this example only). The data pattern includes two logical ZEROS located between two logical ONES, A and B (1001). The time interval of each bit is 50 nanoseconds. Therefore, the logical ONES are spaced 150 nanoseconds apart in time so that the delay circuitry 12 will receive the two logical ONE signals A and B 150 nanoseconds apart. If no compensation is imparted to the ONE signals A and B these two ONE signals will be written 150 nanoseconds apart in time on the disk 24. But since the nonadaptive delay circuitry 12 automatically imparts 2 nanoseconds of negative delay, the ONE signals A and B will be written 148 nanoseconds apart. For illustrative purposes, it is further assumed that the peak shift between the ONE signals A and B causes a positive delay of 6 nanoseconds when there is no prewrite compensation whatsoever. This means that when the read channel is activated, the disk drive assembly 14 will detect the two flux transitions at a time interval of 154 nanoseconds, i.e., the ONE signals A and B were written 148 nanoseconds apart (150 nanoseconds minus 2 nanoseconds imparted by the nonadaptive delay circuitry 12) plus 6 nanoseconds delay due to peak shift equals 154 nanoseconds. The signals generated by the ONE signals A and B therefore will be processed 154 nanoseconds apart, and will proceed down the read channel back to the drive interface 16 to appear to have been written 154 nanoseconds apart, rather than the desired 150 nanoseconds, even though actually written 148 nanoseconds apart.

The writing and reading process will now be discussed with the actual systems of the present invention where an adaptive prewrite delay value is imparted to the writing signal. Again, a data pattern is written into the system at the drive interface 16 and sent to the delay circuitry 12 (once again, and from now on the delay circuitry 12 will be considered to be adaptive). The signal is processed in the delay circuitry 12 and an adaptive prewrite delay value is determined based on the recording head 22 which will be used for writing the data, the writing location and the data pattern. That adaptive prewrite delay value is then applied to the data pattern. In this example, since the peak shift is 6 nanoseconds and the desired time interval at readback is 150 nanoseconds, a 6 nanosecond negative delay value is applied, meaning that the ONE signals A and B are written 6 nanoseconds closer in time than if there were no peak shifts. Therefore, the compensated data pattern sends logical ONE signals A and B out at a time interval of 144 nanoseconds. The recording apart and writes them accordingly. During readback, the disk drive assembly 14 perceives the two logical ONE signals A and B to be 150 nanoseconds apart. They are processed at the signal processing circuitry 30 accordingly. When the data pattern is received back at the drive interface 16, the data pattern is read so that the logical ONE signals A and B are 150 nanoseconds apart, thus achieving the desired object of having the same time interval in readback as in the writing channel prior to entering the delay circuitry 12 of the present invention.

Figure 2:
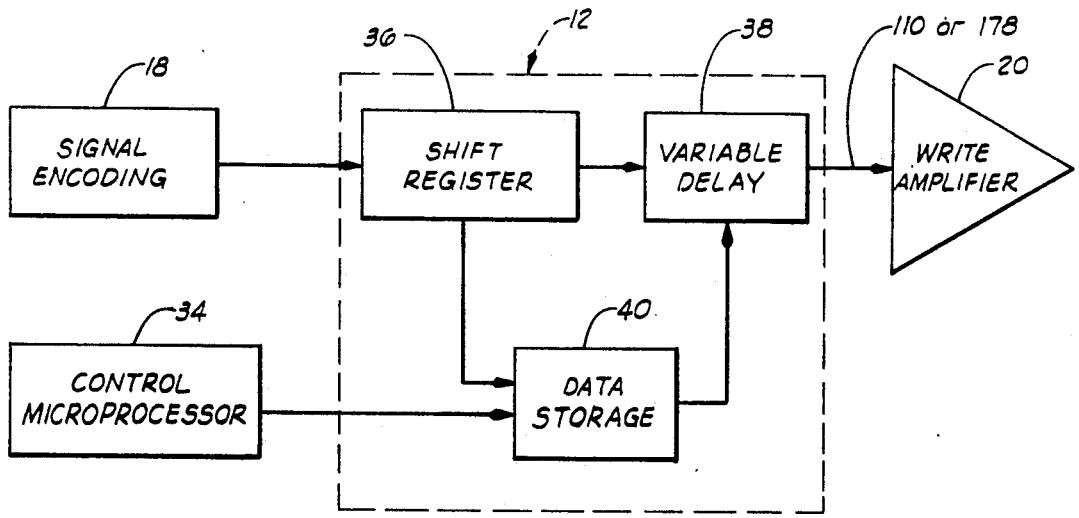
FIG. 2 is a schematic diagram of the delay circuitry of the adaptive prewrite compensation apparatus of FIG. 1.

Referring to FIG. 2, the delay circuitry 12 of the present invention is shown schematically in a block diagram. The data pattern has just been encoded at the signal encoding block 18 and is now received by the delay circuitry 12. The data pattern is received at a shift register 36 and is processed. The data pattern is sent from shift register 36 to a variable delay 38. Simultaneously, the information concerning the data pattern is sent to a data storage element 40 where it is processed and an adaptive prewrite delay value is determined. This information is sent to the variable delay 38 where the adaptive prewrite delay value is applied to the data pattern as it is received from the shift register 36 by adjusting the circuit within the variable delay 38 so that the appropriate number of steps or taps act upon each pulse. The compensated data is then sent out of the variable delay 38 and proceeds along the write channel.

Referring to FIG. 3, one embodiment of the delay circuitry 12 of the present invention is depicted by general reference 44. Again, the circuitry 44 is depicted in block diagram form, and can be incorporated into a circuit board; however, for practical manufacturing purposes, the circuitry depicted would probably be incorporated into LSI circuitry.

All the block components depicted in FIG. 3 are connected electronically wherever lines are drawn to connect components as is conventional in circuit diagrams.

In FIG. 3 the delay circuitry 44 is comprised of the following components.

46 is a first databus electronically connecting many components of the circuitry.

48 is a second databus electronically connecting many components of the circuitry.

50 is a databus for a startup mode, hereinbelow referred to as the startup databus, and is that of the control microprocessor 34.

52, 54 and 56 indicate data latches.

58 is a control data latch.

60 is a static RAM.

62 is a write clock.

The control microprocessor 34 is connected to the data latch 52, to the data latch 54 and to the control data latch 58.

The control data latch 58 is connected to the static RAM 60, to the data latch 52, to the data latch 54 and to the data latch 56.

64 is an electronic line where the serial data pattern is inputted.

The shift register 36 has a number of flip-flops designated 70 through 100 (in even numbers).

102 is a last priority encoder.

104 is a first priority encoder.

The priority encoders 102 and 104 are connected to the data latch 56. The data latch 56 is also connected to an AND gate 106 and to the databus 46. The data latch 56 is connected to the databus 46. The databus 46 is also connected to the static RAM 60, the data latch 52, and the control microprocessor 34. The static RAM 60 is also connected to the control data latch 58.

Another data latch 108 is connected to an AND gate 107 which is connected to the shift register 36. The data latch 108 is connected to the variable delay 38, which is connected to the shift register 36. The variable delay 38 has an output line 110 for sending compensated pulse signals to the write amplifier 20 (FIG. 2).

Referring again to FIG. 3, once the delay circuitry 44 has been constructed, the adaptive prewrite delay values are determined experimentally. The first thing that is determined is what code will be used for the circuitry. Once that has been established, the number of code permutations that can appear in the shift register 36 can be computed. If practicable, each data pattern or subpattern permutation can be tested for individually. The method of testing will be discussed hereinbelow. If testing is not practicable, another technique is to determine stereotypical data patterns. This is the function of the priority encoding system.

Only the closest logical ONE to a central logical ONE is considered by each decoder. Hence if a pattern exists where a logical one occurs two bits away and another logical one four bits away, so that the sequence would be 1001001, the other sequence would be 00001001, and the last one being the central logical one. Using the stereotypical data pattern method, the two data patterns would be treated identically in terms of the delay compensation value. The delay value for the pattern 00001001 would be determined experimentally and any other pattern falling within that mode would be assumed to require the same amount of compensation Once the stereotypical data patterns are determined, then testing is done for each stereotypical data pattern with each head and each writing zone. The amount of peak shift for each permutation is determined by reading and writing. Each disk is divided up into writing zones by means of marking writing zone boundaries. For tracks falling within a given writing zone the value of compensation to be used will be interpolated in a linear fashion.

Once all of the delay values have been experimentally measured, the values are recorded on a disk of the disk drive assembly so that each permutation of stereotypical data pattern, head, and writing zone boundaries has a particular delay value associated with it. Each one of these delay values is given an address and written on the disk for downloading use at each power-up sequence.

In operation, the delay circuitry 44 depicted in FIG. 3 has two modes, a start-up mode and a functional mode. The start-up mode is utilized when the adaptive prewrite compensation apparatus 10 is experiencing a power-up. At that time, the control microprocessor 34 will send a signal to begin the start-up mode. The control microprocessor 34 sends an address signal to the first data latch 52, to the second data latch 54, and to the control data latch 58. The control data latch 58 then sends an enabling signal to the first data latch 52 and a disabling signal to the third data latch 56 and the fourth data latch 108. The enabling signal allows the first data latch 52 to access the databus 46 while the disabling signal prevents access to the databus 46 by the third data latch 56 and the fourth data latch 108. These signals are maintained as along as the circuitry is in the startup mode, so that first data latch 52 can input data into the static RAM 60.

The control microprocessor 34 then sends an address through the first data latch 52 to the static RAM 60. All of the delay values and corresponding addresses are retrieved from the disk 24 (FIG. 1), loaded into the control microprocessor 34 and then loaded into the static RAM 60. The delay values for all permutations are downloaded from the disk 24 through the microprocessor 34 into the static RAM 60 via the data latch 54 and the second databus 48. The address for a given delay value is input through the first data latch 52 into the RAM 60 via the databus 46. Once all of these predetermined data and addresses have been downloaded the startup sequence is completed. The delay values are downloaded into flip-flops in the memory matrix of the static RAM 60.

Once the start-up sequence has been completed, a disabling signal is sent to the first data latch 52, and an enabling signal is simultaneously sent to the data latch 56 and the data latch 108. The functional mode then becomes operative.

In the functional mode, the serial pattern is inputted into the shift register 36 through the line 64. The write clock 62 controls the period of the delay circuitry 44. The write clock pulse is transmitted to the shift register 36. Once a given bit is inputted into the shift register 36, it is sent to the first flip-flop 70. Simultaneously, the bit which was stored at 70 goes to 72, the bit which was at 72 goes to 74, and so forth. The final bit located at 100 of the shift register 36 is lost. The central bit is located at flip-flop 84 of shift register 36. If there is a logical ONE bit at flip-flop 84 of shift register 36, at a given time, the delay circuitry 44 computes a delay value. If there is a logical ZERO at the central bit site 82, the delay circuitry 44 performs no computation for that data pattern. When a logical ONE is inputted into flip-flop 84 of shift register 36, the flip-flop 84 sends a logical ONE signal to activate the data latch 56 to perform the operation for which the present invention is designed.

Simultaneously with the arrival of a logical ONE at flip-flop 84, any logical ONES located at flip-flops 70-78 go to the last priority encoder 102. There can be no logical ONES at 80 or 82 because of the rules for the 2,7 encode. Also, signals are simultaneously sent from the flip-flops 90-98 to the first priority encoder 104. Likewise flip-flops 86 and 88 can have no logical ONES located there when a logical ONE is located at flip-flop 84 because of the 2,7 code rules. The last priority encoder 102 determines the closest logical ONE to the central logical ONE. In other words, if there is a logical ONE at flip-flop 78, the last priority encoder 102 quits its search and employs a stereotypical data subpattern for 00001001. If it does not find a logical ONE at flip-flop 78, it looks for one at flip-flop 76, and so forth through flip-flop 70. If there is no logical ONE located at any of these flip-flops, it is assumed that this is a maximum spacing for the 2,7 code i.e. 100000001. Likewise the first priority encoder 104 looks first at the flip-flop 90 for a logical ONE closest to the central logical ONE. If it finds one there, it employs the stereotypical data subpattern 10010000. If a logical ONE is not found at the flip-flop 92, sequentially the first priority encoder 104 looks at flip-flops 92-100.

As that particular data subpattern moves down the series of flip-flops, two things happen. First, when the central logical ONE for the data pattern in question moves three flip-flops, i.e. three periods later, that signal is not only sent from flip-flop 88 to flip-flop 90 but also from flip-flop 90 to the data latch 108 through gate 107 as a timing signal so that a write delay value is received from the RAM 60 and latched into the data latch 108.

When the same signal arrives at flip-flop 94, i.e., when another two periods have transpired, that signal is not only sent to flip-flop 96 but also to the variable delay 38 where that signal is operated on such that it is compensated according to the appropriate delay value which has been latched into the data latch 108.

Before that can happen, the stereotypical data subpatterns of the last priority encoder 102 and the first priority encoder 104 are sent to the data latch 56 where the complete stereotypical data pattern thereat is the combination of the last stereotypical data pattern combined with the first stereotypical data pattern to give a complete data pattern. This complete data pattern is sent to the static RAM 60 where the address of this complete stereotypical data pattern is accessed in combination with the head and writing zone sent from the control microprocessor 34. When the complete address is determined, the delay value for that unique permutation is accessed and that delay value is then sent to the data latch 108 where it controls the number of steps for the adjustment so that the appropriate number of delay steps is in the circuit going from the flip-flop 94 and out the line 110 for compensated data.

The delay circuitry 44 continues to process logical ONES in the same fashion, each logical ONE arriving at the shift register 36 and becoming the central logical ONE for a given pattern, in turn, and then eventually arriving at the flip-flop 94 where the signal for the logical ONE is sent to be operated upon with the appropriate delay value.

The connections between the shift register 36, the variable delay 38 and the data latch 108 are chosen so that the circuit timing requirements of the RAM 60 and the data latches are satisfied. The actual connections may change if faster or slower circuitry is used.

It will be clear that the present invention is well adapted to carry our the objects and attain the ends and advantages mentioned as well as those inherent therein. While presently preferred embodiments of the invention have been described for purposes of this disclosure numerous changes may be made which will readily suggest themselves to those skilled in the art and which are encompassed within the spirit of the invention disclosed and as defined in the appended claims.

What is claimed is:

1. In a data storage device of the type including a rotating disc having a magnetizable surface for magnetically storing data expressed as a serial data stream and write means responsive to non-zero bits of the data stream for writing the data stream to the surface of the disc, a prewrite compensation circuit for selectively delaying the writing of non-zero bits of a data stream to a selected disk surface of a hard disk drive, comprising:
   a shift register through which the data stream is passed;
   delay means, connected between the shift register and the write means for transmitting each non-zero bit from the shift register to the write means after an amount of delay specified by an electronically expressed delay word received by the delay means;
   a RAM containing a plurality of delay words selected in rotation to the pattern of bits of the data stream preceding and following each non-zero bit of the data stream, the selected disk surface to which the data stream is to be written and the location on the selected surface to which the data stream is to be written, wherein the RAM is connected to the delay means for providing a delay words at a selected RAM address to the delay means; and
   RAM addressing means, connected to the shift register for reading bits of the data stream preceding and following each non-zero bit, for providing an address to the RAM wherein the RAM addressing means comprises:
      first priority encoder means, connected to the shift register to detect the pattern of bits of the data stream preceding the non-zero bit to be written, for generating a portion of the RAM address in relation to the nearest non-zero bit preceding the non-zero bit to be written; and
      last priority encoder means, connected to the shift register to detect the pattern of bit of the data stream following the non-zero bit to be written, for generating a portion of the RAM address in relation to the nearest non-zero bit following the non-zero bit to be written.

2. The apparatus of claim 1 wherein the delay words and addresses therefor are stored on a disk surface at times that the disk drive is not in use and wherein the apparatus further comprises means for loading the delay words into the RAM at a selected time during the operation of the disk drive.

3. A method for delaying the writing of non-zero bits of a data stream to a selected writing zone of a selected surface of one of a plurality of disks of a hard disk drive, comprising the steps of:
   storing a plurality of delay words selected in relation to the pattern of bits of the data stream preceding and following each non-zero bit of the data stream for each writing zone on each disk surface at different addresses in a RAM;
   passing the data stream through a shift register;
   detecting the pattern of bits preceding and following each non-zero bit to be written as the data stream passes through the shift register;
   addressing the RAM in relation to the selected writing zone of the selected disk and in relation to said pattern to select one of the stored delay words; and
   delaying the writing of the non-zero bits by an amount determined by the selected one of the delay words;
wherein the step of detecting the pattern of bits preceding and following each non-zero bit to be written comprises the steps of:
   detecting the nearest non-zero bit of the data stream preceding the non-zero bit to be written; and
   detecting the nearest non-zero bit of the data stream following the non-zero bit to be written; and
wherein the step of addressing the RAM is further characterized as addressing the RAM in relation to the selected writing zone of the selected disk and in relation to the nearest non-zero bits of the data stream preceding and following the non-zero bit written.

* * * * *